US007131463B2

(12) United States Patent
Schlitzkus et al.

(10) Patent No.: US 7,131,463 B2
(45) Date of Patent: Nov. 7, 2006

(54) DEVICE FOR DAMPING PRESSURE PULSATIONS AND A HYDRAULIC UNIT EQUIPPED WITH THIS DEVICE

(75) Inventors: Michael Schlitzkus, Dietmannsried (DE); Andreas Weh, Durach (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 10/942,833

(22) Filed: Sep. 17, 2004

(65) Prior Publication Data

US 2005/0056331 A1 Mar. 17, 2005

(30) Foreign Application Priority Data

Sep. 17, 2003 (DE) ................................ 103 42 936

(51) Int. Cl.
*F16K 47/00* (2006.01)

(52) U.S. Cl. ...................................... 138/41; 303/113.1

(58) Field of Classification Search .................. 138/41; 303/113.1

See application file for complete search history.

(56) References Cited

U.S. PATENT DOCUMENTS

| | | | | |
|---|---|---|---|---|
| 6,398,315 | B1 * | 6/2002 | Dinkel et al. | 303/113.1 |
| 6,668,863 | B1 * | 12/2003 | Maier | 138/42 |
| 6,805,160 | B1 * | 10/2004 | Keichler | 138/41 |
| 7,004,574 | B1 * | 2/2006 | Neese et al. | 347/85 |

* cited by examiner

*Primary Examiner*—John Fox
(74) *Attorney, Agent, or Firm*—Ronald E. Greigg

(57) ABSTRACT

Pressure pulsations are damped in and a hydraulic unit by a device including a housing with an inlet and an outlet having a throttle and a filter preceding the throttle. The filter and the throttle are combined into a one-piece function element, which can be produced without metal-cutting machining and which can be fixed in the interior of the housing. This preceding filter prevents clogging of the throttle by contaminants in the pressure fluid, without requiring additional expense for parts or assembly. The function element can be produced economically in a minimum number of work steps, can be manipulated without problems, and in an advantageous refinement makes it possible to avoid unwanted accumulations of air in the device.

20 Claims, 2 Drawing Sheets

Fig. 2
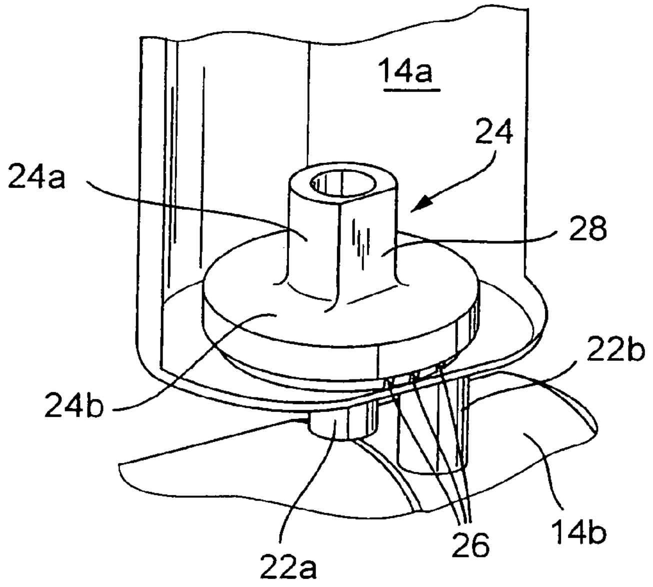
Fig. 3
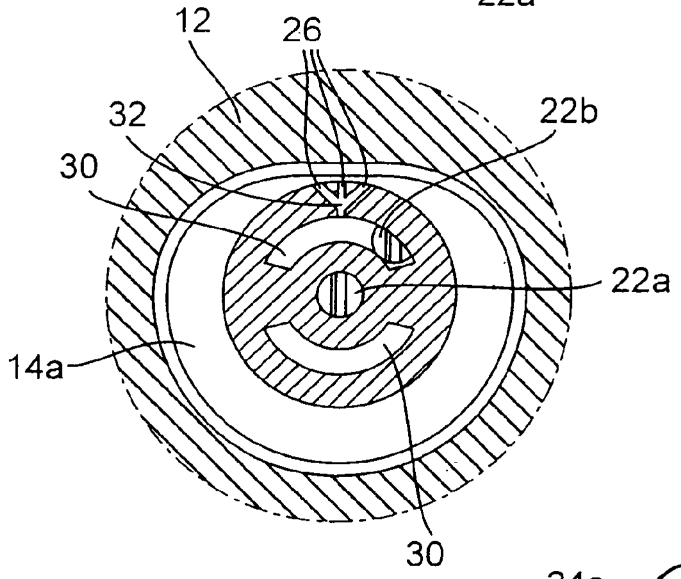
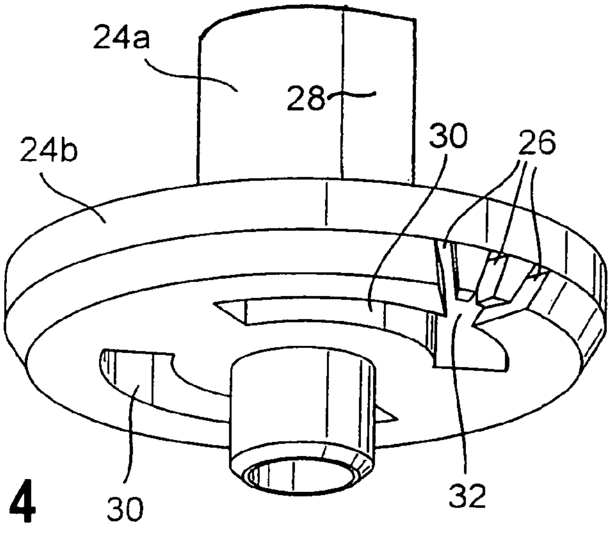
Fig. 4

DEVICE FOR DAMPING PRESSURE PULSATIONS AND A HYDRAULIC UNIT EQUIPPED WITH THIS DEVICE

BACKGROUND OF THE INVENTION

1. Field of the Invention

The invention relates to a device for damping pressure pulsations, and a hydraulic unit equipped with this device, in an electronically regulatable vehicle brake system. For regulating the brake pressure required at the wheel brake cylinders, electronically regulatable vehicle brake systems require pump elements, which are acted upon as needed by a rotating drive element. This action is effected cyclically, and as a result, pressure pulsations can occur in the hydraulic circuit connected to it during the regulation cycle. The pressure pulsations can be transmitted to the brake pedal via the master cylinder located in the hydraulic circuit. The consequence is unwanted pulsating motions of this brake pedal as well as noise that is perceptible in the vehicle interior.

2. Description of the Prior Art

For damping the pressure pulsations in an electronically regulatable brake system, a device is already known from German Patent Disclosure DE 42 34 013 A1. FIG. 3 of this reference shows a hydraulic block of an electronically controllable vehicle brake system, with a receiving bore which forms the housing of the device. The receiving bore is closed off from its surroundings by a cap anchored by positive engagement, and in its interior it defines a damping chamber. An inflow conduit arriving from a pump element discharges into this chamber, and an outflow conduit emerges from it. At the exit point of the outflow conduit there is a throttle, along with a separate filter element preceding the throttle. The filter element prevents clogging of the throttle from an accumulation of dirt.

It is a disadvantage of the design of this known noise-damping device that the filter and the throttle are each individual components, which must be anchored to the hydraulic block in separate assembly steps. The individual components are of metal and are relatively complicated to produce, in multiple machining steps. Their reliable fixation must be checked and assured during assembly. This makes the known device comparatively expensive.

OBJECT AND SUMMARY OF THE INVENTION

With the above background, it is the object of the present invention to provide both a device for damping pressure pulsations and a hydraulic unit equipped with this device, which preclude these disadvantages and, with a design that is as space-saving and economical as possible, have especially good damping properties.

The proposed device for damping pressure pulsations includes a function element, in which the throttle and the filter are combined in a single component. This function element can be anchored in the interior of a housing of the damping device, in a single work step that is simple to perform. It can be produced without metal-cutting machining and hence economically, preferably by injection molding from plastic. By means of a filter preceding the throttle, clogging of the throttle by dirt contained in the pressure fluid is averted. Otherwise, a clogged throttle could cause an impermissible pressure increase that could damage the components in the hydraulic unit. In an extreme case, the pressure increase could even cause leaks of the hydraulic unit and thus could lead to total failure of the brake system.

An orientation aid can be mounted on the proposed device. With this orientation aid, the device can be oriented in a targeted way during the assembly process. With the orientation of the function element, additional prevention of an accumulation of air bubbles in the device is achieved. Since air bubbles can cause a reduction in the braking power, they are especially critical to function. Moreover, air that has already invaded the brake system can be eliminated again by a process of scavenging with pressure fluid.

BRIEF DESCRIPTION OF THE DRAWINGS

The invention will be better understood and further objects and advantages thereof will become more apparent from the ensuing detailed description of a preferred embodiment, taken in conjunction with the drawing, in which:

FIG. 2 shows an outline of the device of the invention in the form of an enlarged detail;

FIG. 3 shows a cross section through this device for damping pressure pulsations; and FIG. 4 shows the function element of the damping device as an individual part, viewed from its underside.

DESCRIPTION OF THE PREFERRED EMBODIMENT

Figure 1:
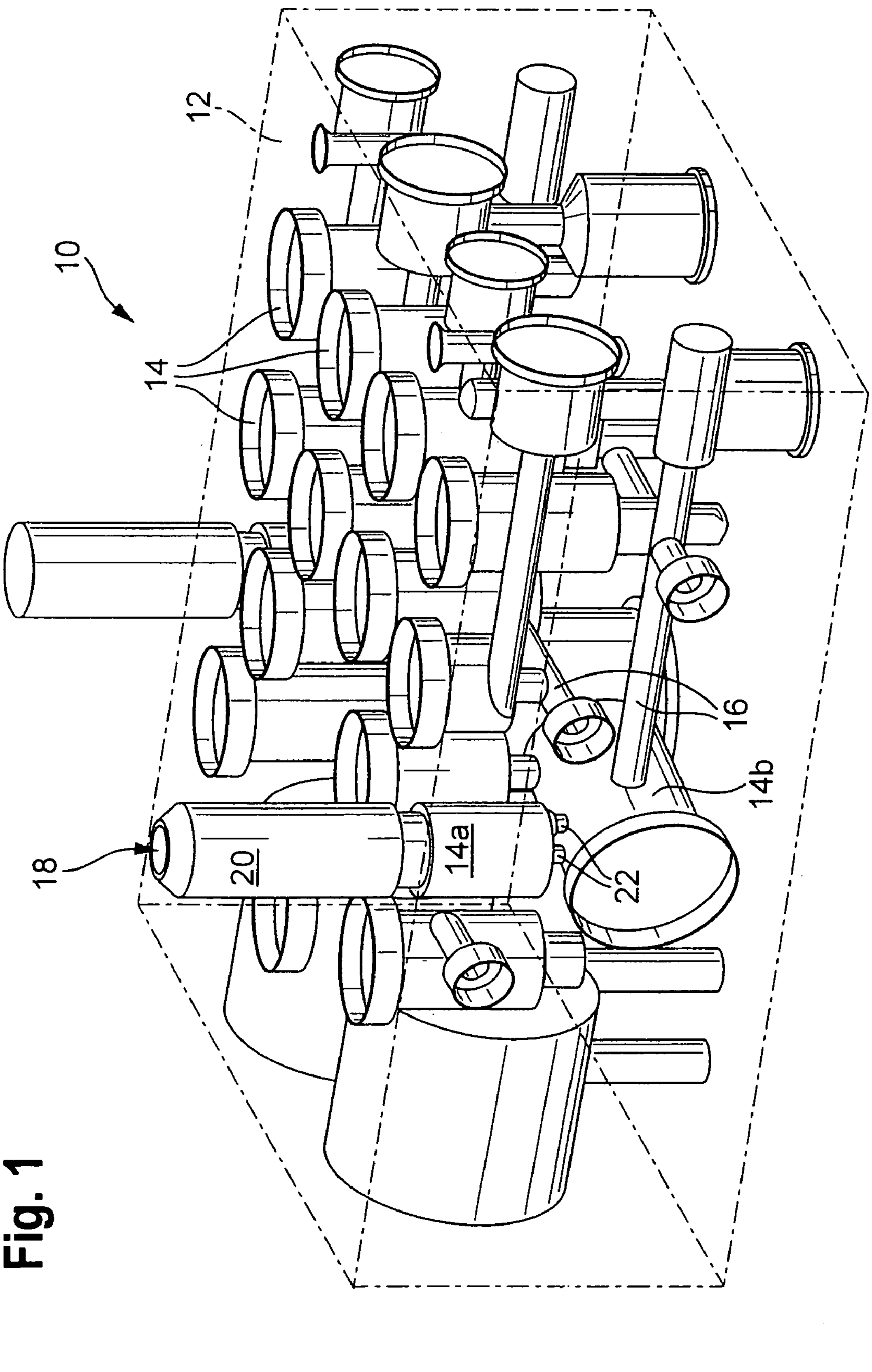
FIG. 1, in a three-dimensional perspective view, shows the housing block of a hydraulic unit of an electronically regulatable vehicle brake system, with the device for damping pressure pulsations mounted on it.

FIG. 1 shows a housing block 12 of a hydraulic unit 10 of an electronically regulatable vehicle brake system in which the block 12 is formed by a metal body, preferably produced by extrusion, which is machined by metal-cutting techniques to form the most various kinds of installation chambers 14. The installation chambers 14 are intended in particular to receive electronically triggerable magnet valves, pump elements, at least one drive element for these pump elements, pressure reservoirs, connections for brake lines, or devices for damping pressure pulsations. Moreover, pressure fluid conduits 16 are embodied in the housing block 12, which connect these various components hydraulically with one another for converting the hydraulic circuit of the vehicle brake system.

The installation chambers 14 are open toward at least one outer side of the housing block 12 and, together with the pressure fluid conduits 16 are oriented essentially at right angles to one another. This is favorable from a production standpoint, because then the requisite metal-cutting machining of the housing block 12 can be performed in as few chucking operations as possible.

For the sake of simplicity, FIG. 1 shows only a single device 18 for damping pressure pulsations for the sake of disclosure of the invention. This damping device 18 includes an installation chamber 14*a*, open toward one outer side, into the opening of which a hollow-cylindrical sleeve body 20, closed on one end, is inserted. This sleeve body 20 protrudes, with its closed end, past that outer side of the housing block 12 where an electronic control unit is attached in a later stage of assembly. Then, the sleeve body 20 protrudes into the interior of this control unit. The end of the installation chamber 14*a* of the damping device 18 located inside the housing block 12 communicates, via two short, straight branch conduits 22, with an installation chamber 14*b* of one pump element. As shown in FIG. 1, this installation chamber 14*b* is located below the installation chamber 14*a* of the damping device 18, and its longitudinal axis extends transversely to the longitudinal axis of the installation chamber 14*a*. The tie conduits 22 form the inlet 22*a* and the outlet 22*b* (FIG. 2) of the damping device 18 and thus assure the flow through it of pressure fluid. A hydraulic short circuit between the inlet 22*a* and the outlet 22*b* is averted by means of the outer contour of the built-in pump element (not visible in the drawing).

FIG. 2 shows a view into the interior of the installation chamber 14*a* of the damping device 18. Inserted into it according to the invention is a one-piece function element 24, which includes a tubular first part 24*a* and a radially protruding second part 24*b* integrally formed onto the first. The tubular first part 24*a* extends onward on both sides of the second part 24*b*. The lower extension, not visible in FIG. 1, of the tubular part 24*a* is inserted into the tie conduit, forming the inlet 22*a*, far enough that the end face, toward the tie conduits 22, of the second part 24*b* rests on the bottom of the installation chamber 14*a*. This end face covers the orifice cross section of the second tie conduit, forming the outlet 22*b*, into the interior of the damping device 18. In the exemplary embodiment shown, the second part 24*b* of the function element 24 is disk-shaped, with two opposed, parallel end faces. The end face toward the bottom of the installation chamber 14*a* has an inward-oriented chamfer extending all the way around. Three flow grooves 26, for example, emerge at the outer circumferential surface of this chamfer and together form a (gap) filter, which traps contaminants in the pressure fluid.

FIG. 2 furthermore shows an orientation aid, in the form of a flat face 28 which is embodied for example on the circumferential surface of the upward-protruding portion of the tubular first part 24*a*. This orientation aid 28 is oriented relative to the flow grooves 26 in order to determine the desired position of these flow grooves 26 in the installation of the function element 24 from above into the installation chamber 14*a*. The background for such an arrangement will now be described in conjunction with FIG. 3.

FIG. 3 shows a detail of circular shape of the housing block 12, with the installation chamber 14*a* embodied in it for the damping device 18. The part of FIG. 3 that is not shaded indicates the bottom face of the installation chamber 14*a*. It can be seen that the installation chamber 14*a* has a cross section in the form of a circular area flattened on one side. Approximately at the center point of this circular area, the inlet 22*a* discharges into the interior of the installation chamber 14*a*. Radially offset from the inlet 22*a*, the outlet 22*b* of larger cross section can be seen. The latter is covered by the disk-shaped second part 24*b* of the function element 24. The visible free portion of the outlet 22*b* is in communication with a crescent-shaped, groovelike recess 30, which begins at the end face, toward the bottom of the installation chamber 14*a*, of the function element 24. This crescent-shaped recess 30 is opposed by a corresponding second recess. However, the latter is present only for production reasons, to avoid an accumulation of material; otherwise, it is of no further technical importance. The three flow grooves, for example, already mentioned in conjunction with the description of FIG. 2 discharge into the first crescent-shaped recess 30. These three flow grooves 26 are given a course such that they meet in a node in the immediate vicinity of the associated crescent-shaped recess 30. This node forms the throttle restriction 32, whose cross section, while larger than the cross sections of the individual flow grooves 26, is nevertheless smaller than the total flow cross section of the three grooves 26. Remote from the throttle restriction 32, the three flow cross sections 26 emerge into the installation chamber 14*a* of the damping device 18. These discharge points are oriented in a targeted way, with the aid of the orientation aid 28 referred to in conjunction with FIG. 2, and specifically are oriented such that they are located in the region of the highest point of the damping device 18. FIG. 3 shows the damping device 18 in a later installed position. The orientation of the function element 24 assures that any gas bubbles occurring in a brake system and collecting at the highest point will be carried away with the pressure fluid flowing out through the damping device 18. Accordingly, relatively large bubbles cannot accumulate in the interior of the damping device 18. On the occasion of brake system maintenance, any gas that has already entered can furthermore be removed again in this way by means of a scavenging process.

The function element 24 already described is shown again in FIG. 4 in perspective, from its underside. The same reference numerals used thus far are also used in FIG. 4. FIG. 4 once again clearly shows the region of the tubular first part 24*a* of the function element 24 that protrudes into the inlet 22*a*. This region forms a neck, which is inserted, preferably press-fitted, into the inlet 22*a* in pressure-fluid-tight fashion. The pressure fluid flows through this tubular part 24*a* and emerges at its end into the interior of the installation chamber 14*a*. The outflow from the installation chamber 14*a* takes place through the flow cross sections 26 that form the filter and onward to the throttle restriction 32 and from there, finally, through the crescent-shaped recess 30, which is closed at the top, to the outlet 22*b*. A plane contact of the end face of the second part 24*b* with the bottom face of the installation chamber 14*a* assures that no pressure fluid can reach the outlet 22*b* without passing through the filter or the throttle restriction 32. Accordingly, with the function element 24 described, both the filter and the throttle restriction 32 are combined in a single component, which is simple to produce and can be anchored without problems on the housing block 12 of a hydraulic unit 10 of a vehicle brake system. Especially favorably, the function element 24 can be made by injection molding from plastic in one operation. Metal-cutting postmachining can be dispensed with as a result.

It is understood that additions or further refinements of the exemplary embodiment described are conceivable without departing from the fundamental concept of the invention.

The foregoing relates to a preferred exemplary embodiment of the invention, it being understood that other variants and embodiments thereof are possible within the spirit and scope of the invention, the latter being defined by the appended claims.

We claim:

1. A device (18) for damping pressure pulsations, the device comprising

- a housing (20) which defines a damping volume and, for the flow through it of pressure fluid, has an inlet (22*a*) discharging into and an outlet (22*b*) emerging from the interior of the housing (20),
- a throttle (32) disposed in the region of the outlet (22*b*), and
- a filter (26) preceding the throttle (32),
- the filter (26) and the throttle (32) being combined into a one-piece function element that can be produced without metal-cutting machining and being fixed in the interior of the housing (20).

2. The device in accordance with claim 1, wherein the function element (24) comprises

- a first part (24*a*), which is anchored in pressure-fluid-tight fashion in the region of the orifice cross section of the inlet (22*a*), and a second part (24*b*) integrally formed onto it, the second part (24*b*) having an end face covering the cross section of the outlet (22*b*), the filter (26) and the throttle (32) being embodied on the second part (24*b*) in the form of at least one gap filter and one gap throttle, whose flow cross section discharges into the outlet (22*b*).

3. The device in accordance with claim 1, wherein the flow cross sections of the filter (26) and of the throttle (32) are oriented transversely to the longitudinal axis of the tubular portion of the function element (24); and wherein the second part (24*b*) has a recess, closed toward the interior of the housing (20) and open toward the outlet (22*b*), into which recess the flow cross section of the throttle (32) discharges.

4. The device in accordance with claim 2, wherein the flow cross sections of the filter (26) and of the throttle (32) are oriented transversely to the longitudinal axis of the tubular portion of the function element (24); and wherein the second part (24*b*) has a recess, closed toward the interior of the housing (20) and open toward the outlet (22*b*), into which recess the flow cross section of the throttle (32) discharges.

5. The device in accordance with claim 3, further comprising a plurality of flow cross sections of the filter (26) combined in at least one node point which forms the throttle (32).

6. The device in accordance with claim 4, further comprising a plurality of flow cross sections of the filter (26) combined in at least one node point which forms the throttle (32).

7. The device in accordance with claim 1, further comprising at least one orientation aid (28) that is recognizable in the installed state and disposed in the function element (24), the at least one orientation aid, because of its relative position to the flow grooves (26), enabling an orientation of the function element (24), whose orientation is effected such that the flow cross sections of the filter (26), in the installed position of the device (18), drain out at the highest point thereof.

8. The device in accordance with claim 2, further comprising at least one orientation aid (28) that is recognizable in the installed state and disposed in the function element (24), the at least one orientation aid, because of its relative position to the flow grooves (26), enabling an orientation of the function element (24), whose orientation is effected such that the flow cross sections of the filter (26), in the installed position of the device (18), drain out at the highest point thereof.

9. The device in accordance with claim 3, further comprising at least one orientation aid (28) that is recognizable in the installed state and disposed in the function element (24), the at least one orientation aid, because of its relative position to the flow grooves (26), enabling an orientation of the function element (24), whose orientation is effected such that the flow cross sections of the filter (26), in the installed position of the device (18), drain out at the highest point thereof.

10. The device in accordance with claim 5, further comprising at least one orientation aid (28) that is recognizable in the installed state and disposed in the function element (24), the at least one orientation aid, because of its relative position to the flow grooves (26), enabling an orientation of the function element (24), whose orientation is effected such that the flow cross sections of the filter (26), in the installed position of the device (18), drain out at the highest point thereof.

11. The device in accordance with claim 2, wherein the outer dimension of the second portion (24*b*) of the function element (24) is adapted to the housing (20) such that between the circumferential surface of the second part (24*b*) and the inner wall of the housing (20), a gap is established whose cross section is essentially equivalent to the total cross sections of the flow grooves (26) of the filter.

12. The device in accordance with claim 3, wherein the outer dimension of the second portion (24*b*) of the function element (24) is adapted to the housing (20) such that between the circumferential surface of the second part (24*b*) and the inner wall of the housing (20), a gap is established whose cross section is essentially equivalent to the total cross sections of the flow grooves (26) of the filter.

13. The device in accordance with claim 5, wherein the outer dimension of the second portion (24*b*) of the function element (24) is adapted to the housing (20) such that between the circumferential surface of the second part (24*b*) and the inner wall of the housing (20), a gap is established whose cross section is essentially equivalent to the total cross sections of the flow grooves (26) of the filter.

14. The device in accordance with claim 7, wherein the outer dimension of the second portion (24*b*) of the function element (24) is adapted to the housing (20) such that between the circumferential surface of the second part (24*b*) and the inner wall of the housing (20), a gap is established whose cross section is essentially equivalent to the total cross sections of the flow grooves (26) of the filter.

15. The device in accordance with of claim 1, wherein the function element (24) is preferably produced by injection molding from plastic.

16. The device in accordance with of claim 1, wherein the function element (24) has a tubular first part (24*a*), which is press-fitted into the inlet (22*a*) of the damping device (18).

17. The device in accordance with of claim 3, wherein the function element (24) has a tubular first part (24*a*), which is press-fitted into the inlet (22*a*) of the damping device (18).

18. The device in accordance with of claim 7, wherein the function element (24) has a tubular first part (24*a*), which is press-fitted into the inlet (22*a*) of the damping device (18).

19. A hydraulic unit (10) for an electronically regulatable vehicle brake system, the unit comprising a housing block (12) having installation chambers (14), a motor that can be disposed on the housing block (12) for actuating a drive element, a pump that is acted upon by the drive element, conduits (16) in the housing block (12) that carry pressure fluid, valves for regulating the pressure in the conduits (16) that carry pressure fluid, wherein for pressure regulation, the valves are triggerable by an electronic control unit, and a device (18) for damping pressure pulsations, the device (18) including a housing (20) which defines a damping volume and, for the flow through it of pressure fluid, has an inlet (22*a*) discharging into and an outlet (22*b*) emerging from the interior of the housing (20), a throttle (32) disposed in the region of the outlet (22*b*), and a filter (26) preceding the throttle (32), the filter (26) and the throttle (32) being combined into a one-piece function element that can be produced without metal-cutting machining and being fixed in the interior of the housing (20).

20. The hydraulic unit in accordance with claim 9, wherein the device (18) for damping pressure pulsations protrudes with its housing (20) past an outer face of the housing block (12), and this outer face is intended for securing an electronic control unit.

* * * * *